Figure 1:
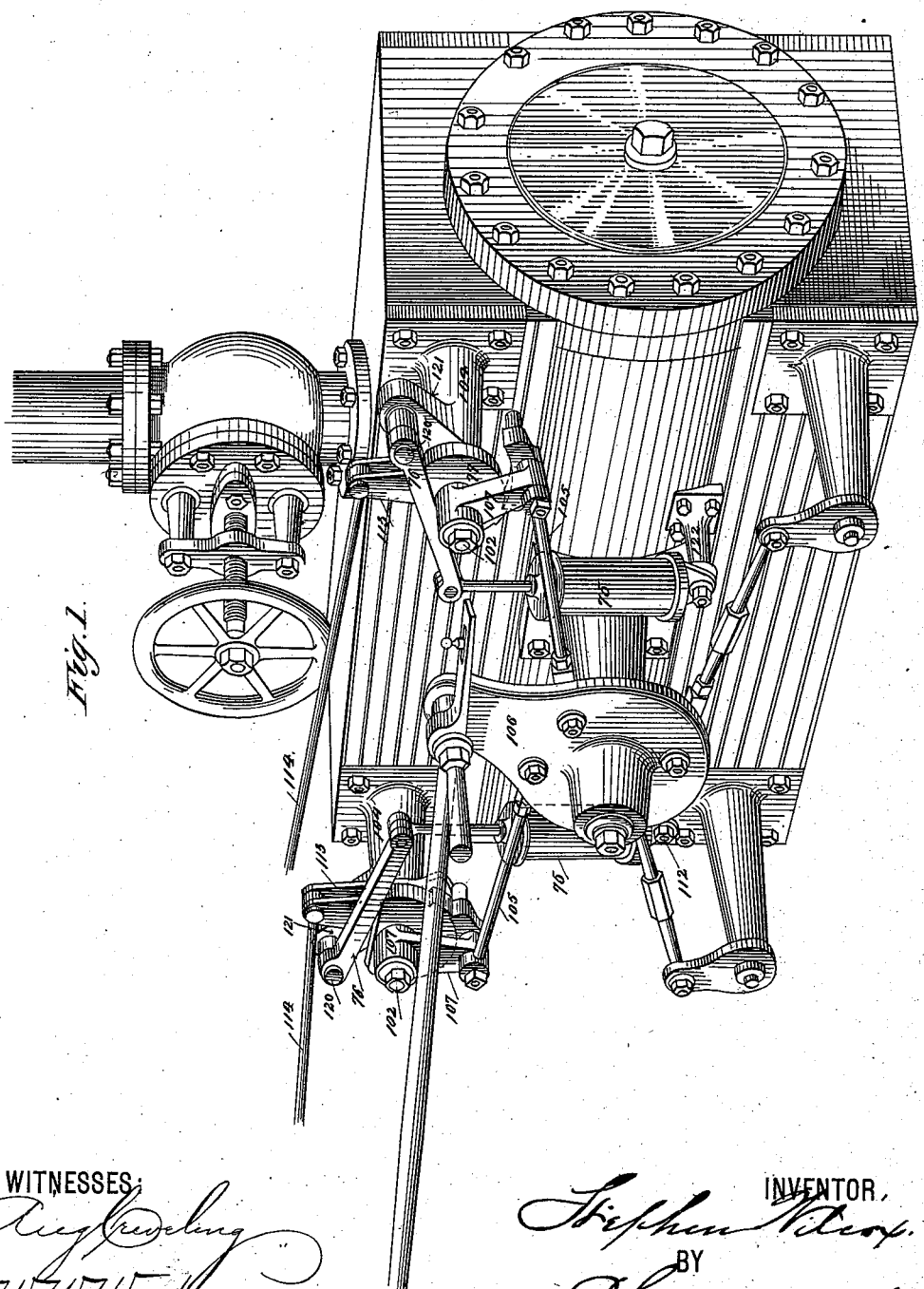

(No Model.)   S. WILCOX.   2 Sheets—Sheet 1.
VALVE MECHANISM FOR ENGINES.

No. 382,578.   Patented May 8, 1888.

WITNESSES   INVENTOR.
             BY
             ATTORNEY.

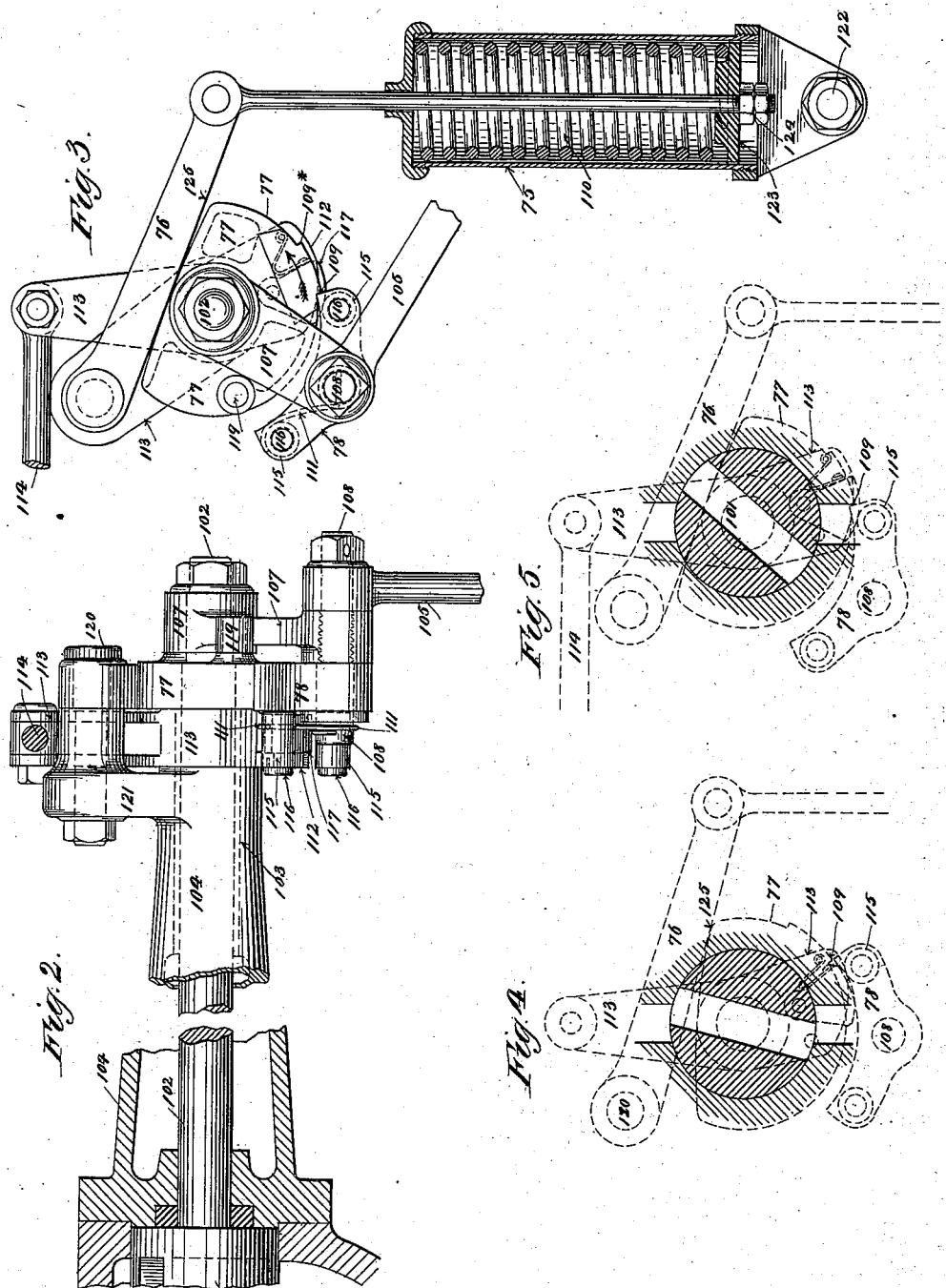

UNITED STATES PATENT OFFICE.

STEPHEN WILCOX, OF BROOKLYN, NEW YORK.

VALVE MECHANISM FOR ENGINES.

SPECIFICATION forming part of Letters Patent No. 382,578, dated May 8, 1888.

Application filed March 21, 1887. Serial No. 231,658. (No model.)

*To all whom it may concern:*

Be it known that I, STEPHEN WILCOX, a citizen of the United States, residing at Brooklyn, county of Kings, and State of New York, have invented certain new and useful Improvements in Valve Mechanism for Steam and other Engines, of which the following is a specification, reference being had to the accompanying drawings.

This invention relates to a system of induction-valves and valve-operating mechanism corresponding in action substantially to that of the well-known Corliss system, in which a rapid-closing movement is imparted to the induction-valves when cutting off at any period of the stroke of the piston.

It is found expedient frequently in modern practice to run engines developing above one hundred horse-power at a speed of three hundred revolutions per minute and upward. The employment of the usual dash-pots, rods, and gripping mechanism for the valve rock-arms, such as heretofore used in the Corliss type, are found impracticable for such speeds, owing to the rapidity of the changes of motion, which cause the inertia and momentum of the parts to develop into strains and blows that render the action uncertain and shorten the endurance of the mechanism.

The object of the present invention is to overcome these defects in the aforesaid system and adapt the same to the requirements of high-speed engines; and to this end the invention consists of certain improved features of construction and novel arrangement of the several parts, whereby the range of motion, weight, and consequent inertia of the same are reduced to the minimum, and freedom from vibration under rapid action, as well as compactness of structure, is obtained, and whereby the action of the cut-off is rendered so instantaneous as to leave but a trace of wire-drawing of the steam or other compressed fluid entering the cylinder.

The invention is applicable to steam, gas, air, or other engines in which any compressed elastic fluid is employed as a motive agent.

In the accompanying drawings, in which like figures of reference indicate corresponding parts in the several views, Figure 1 is a general perspective view of the invention applied to a horizontal-engine cylinder, showing the usual wrist-plate and necessary connections for operating the induction and exhaust valves, and a portion of the eccentric-rod and speed-regulator rods. Fig. 2 is an enlarged side elevation of the valve-opening and tripping devices, showing also a portion of the induction valve, stem, and bonnet in section; Fig. 3, a front elevation of Fig. 2, together with the closing device, the spring and spring-casing of the latter being shown in section; and Figs. 4 and 5, diagrams illustrating the open and closed positions respectively of the induction-valve and corresponding action of the valve operating mechanism.

The projecting stem 102 of the valve 101 is supported in the bearing 103 in the bonnet or other suitably-shaped bracket, 104. Upon or near the outer end of the valve-stem a disk, 77, is keyed, so as to carry said stem and valve with it by its rocking movement. This rocking movement is imparted in the direction of the valve-opening stroke by the rod 105, attached to the wrist-plate 106, Fig. 1, and swung at its opposite end in an arc concentric to the disk 77 by means of the loose arm 107 turning loosely upon the end of the valve-stem and carrying with it a spring-pawl, 78, pivoted on the stud 108, so as to engage or disengage with the tooth or notch 109, projecting from the periphery of the said disk. The closing stroke of the valve is effected by the release of the pawl 78 and the depressing action of the cam-lever 76 upon the cam-surface of the disk 77 and the compression-spring 110 in the casing 75, which causes the valve to resume its normal position. The lever 76 is pivoted at 120 to the rigid arm 121 of the bonnet or bracket 104. The periphery of the disk 77 adjacent to the lever 76 is made slightly curved, so that its turning movement in either direction from the normal position will be returned by the depressing action of the lever 76. The cam-surface thus employed may be located on a separate piece keyed to the valve-stem; but the cam and disk are preferably combined in one piece, of segmental form, as shown, for the purpose of compact construction. The acting end of the pawl 78 is pressed toward the periphery of the disk by means of the spring 111, secured to the stud 108 and acting on the free end of the pawl, as shown. The pawl is disengaged at the proper moment in opposition to the spring 111 by the tripping action of the regulator-cam 112, which is formed upon the lower extension of the arm 113, the same being subject either to automatic adjustment by means of the usual speed-regulator or to adjustment by hand, the speed-regulator in the present illustration being connected by the rod 114. The pawl is provided with an anti-friction roller, 115, upon its pin 116, by which it is brought into operative contact with the tripping-cam 112 with a reduction of friction. An interposed toggle, 117, is shown in the drawings pivoted to the tripping-cam and having an acting-surface, which extends slightly in advance of that of the said tripping-cam for the purpose of further reducing the frictional contact of the pawl-pin.

A stud, 119, is provided on the face of the disk 77, and suitably cushioned on its sides by a leather washer for the purpose of insuring the proper relative positions of the loose arm 107 and disk 77 after the closing stroke of the valve preparatory to the re-engaging of the pawl 78. The pawl 78 is preferably made double, having its acting and free ends alike, and provided with duplicate friction-roller studs 116, so as to permit its reversal when one end becomes worn after long service. For a similar purpose the tooth 109 of the disk 77 is made upon a separate dovetailed steel block inserted into a corresponding socket in said disk, the said block being reversible and having duplicate tooth-edges 109 and 109.

The spiral spring 110 is preferably inclosed in a cylindrical casing, 75, or may be provided with a central core or guide fitting the interior of its coils. The casing 75 is swiveled at 122 to a stud projecting from the side of the cylinder, as shown in Fig. 1, to allow for the play of the lever 76, and for purposes of convenience is left open at the bottom, the plate 123 being thereby easily removed and the spring replaced, if necessary, by the removal of the nut and jam-nut 124. The nuts 124 also serve as a means for readily adjusting the tension of the spring. It will be observed that the coils of the spring are so compressed as to render the intervening spaces between the coils less than the diameter of the wire, and thereby prevent the intermeshing or screwing together of the same should the spring become broken, which event would otherwise render it inoperative. In event of breakage, the casing 75 will retain the coils in line and the spring continue to perform its function with slightly-reduced force.

In the operation of the mechanism, as the disk 77 is moved in the direction of the arrow by means of the pawl 78, loose arm 107, and wrist-plate rod 105, its curved periphery or cam-surface transfers the point of contact with the lever 76 to the point 125 nearest the spring 110, the latter being compressed until the inclined surface of the regulator-cam 112 has released the pawl from the tooth 109, the present position being shown, together with the relative position of the valve-port in Fig. 4. The depression of the lever 76 now returns the valve to its normal closed position, as in Fig. 5, (corresponding to Fig. 3,) during which act the slightly-curved surface of the cam causes the leverage on the spring 110 to gradually increase and the rate of movement to gradually decrease upon the shortening radius of contact, till the pressure of the spring is quietly transferred to the center of the cam-surface without shock, where it tends to retain the valve. Should the movement be so sudden as to carry the point of contact past the center of the curved cam-surface, the opposite gradual curvature of the same will quietly check said motion under the increased pressure of the shortened leverage of the lever 76 toward its fulcrum. The pawl 78 is preferably tripped from the tooth by a gradual movement on the regulator-cam, commencing at the starting-point of its stroke, whereby the vibration of sudden action will be obviated during rapid movement. This feature will be observed by an inspection of Figs. 4 and 5.

In all prior devices of this kind with which I am familiar the action of the devices that close the valve do not effect the same in such a gradual, quiet, and rapid manner as in my present invention, which is owing to the constant contact of the acting mechanism with the cam-surfaces. Therefore I do not confine myself to the specific devices herein referred to, such as a cam-lever and lever-spring, as it is obvious that modifications and rearrangements may be resorted to for producing this new result.

Having thus fully described my invention, what I claim, and desire to secure by Letters Patent, is—

In an induction-valve-operating mechanism by which a rocking movement is imparted to effect the valve-stroke, the combination of a valve-stem cam having a curved surface, substantially as shown, with a cam-lever and lever-spring, whereby the rotating movement actuating said valve is opposed in either direction from the normal, and the closed position of the latter is resumed and maintained by the action of the said spring and cam-lever when the valve is released from the opening mechanism.

STEPHEN WILCOX.

Witnesses:
CHAS. W. FORBES,
AUG. CREVELING.